United States Patent
Palmer et al.

(10) Patent No.: US 10,909,484 B2
(45) Date of Patent: Feb. 2, 2021

(54) DYNAMIC DIRECTED GRAPH WORKFLOWS

(71) Applicant: Microsoft Technology Licensing, LLC, Redmond, WA (US)

(72) Inventors: Michael Brian Palmer, Edmonds, WA (US); Emad Mohamed Hamdy Elwany, Kirkland, WA (US); Justin Brooks Cranshaw, Seattle, WA (US); Pamela Bhattacharya, Redmond, WA (US); Mayerber Loureiro De Carvalho Neto, Kirkland, WA (US); Charles Yin-che Lee, Bellevue, WA (US); Benjamin Gene Cheung, Menlo Park, CA (US); Andres Monroy-Hernandez, Seattle, WA (US); Todd Daniel Newman, Mercer Island, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 629 days.

(21) Appl. No.: 15/628,313

(22) Filed: Jun. 20, 2017

(65) Prior Publication Data

US 2018/0365614 A1 Dec. 20, 2018

(51) Int. Cl.
*G06Q 10/00* (2012.01)
*G06Q 10/06* (2012.01)
*G06Q 10/10* (2012.01)

(52) U.S. Cl.
CPC ....... *G06Q 10/06311* (2013.01); *G06Q 10/06* (2013.01); *G06Q 10/0633* (2013.01);
(Continued)

(58) Field of Classification Search
None
See application file for complete search history.

(56) References Cited

U.S. PATENT DOCUMENTS 6,978,279 B1 * 12/2005 Lomet ................. G06F 11/1471
7,509,351 B2 * 3/2009 Lomet ................. G06F 11/1471
(Continued)

FOREIGN PATENT DOCUMENTS

WO 2015036817 A1 3/2015
WO 2016185227 A1 11/2016

OTHER PUBLICATIONS

"Mobile Web", Retrieved From: https://en.wikipedia.org/w/index.php?title=Mobile_Web&oldid=560066364, Jun. 17, 2017, 6 Pages.
(Continued)

*Primary Examiner* — Gurkanwaljit Singh
(74) *Attorney, Agent, or Firm* — Liang IP, PLLC

(57) ABSTRACT

A set of nodes are organized into a graph to represent a workflow to enable the dynamic and directed management of that workflow in a decentralized system. Each node maintains a value necessary for execution of the workflow, and includes code to populate that value. A workflow agent manages the population of the values according to an identified dependency structure for the nodes relative to the workflow. As changes are made to the workflow, the workflow agent ensures that values and dependencies of the nodes stay up-to-date. Each node retains historic values, which enables the workflow agent to query several states of the workflow throughout time as changes are made thereto. The dynamic management of the nodes improves the responsiveness of the system to changes, thereby improving computational efficiency.

20 Claims, 5 Drawing Sheets

(52) U.S. Cl.
CPC ............... *G06Q 10/06316* (2013.01); *G06Q 10/063118* (2013.01); *G06Q 10/103* (2013.01)

(56) References Cited

U.S. PATENT DOCUMENTS

| | | | |
|---|---|---|---|
| 7,660,851 B2 | 2/2010 | Manion et al. | |
| 7,895,172 B2* | 2/2011 | Cooper | G06F 16/273 |
| | | | 707/704 |
| 8,121,042 B2 | 2/2012 | Wang | H04L 41/5009 |
| | | | 370/248 |
| 8,265,979 B2* | 9/2012 | Golani | G06Q 10/06316 |
| | | | 705/7.27 |
| 10,402,380 B1* | 9/2019 | Carr | G06F 8/34 |
| 2003/0018627 A1 | 1/2003 | Turner et al. | |
| 2004/0260590 A1* | 12/2004 | Golani | G06Q 10/0633 |
| | | | 705/7.26 |
| 2006/0241867 A1* | 10/2006 | Kuchuk | E21B 49/00 |
| | | | 702/13 |
| 2007/0106667 A1* | 5/2007 | Jain | G06F 16/2343 |
| 2007/0282476 A1 | 12/2007 | Song et al. | |
| 2008/0114847 A1* | 5/2008 | Ma | G06Q 50/184 |
| | | | 709/206 |
| 2008/0120388 A1 | 5/2008 | Ouchi | |
| 2008/0240119 A1* | 10/2008 | Wylie | H04L 41/22 |
| | | | 370/400 |
| 2008/0244606 A1* | 10/2008 | Wylie | G06F 9/5038 |
| | | | 718/104 |
| 2009/0063993 A1 | 3/2009 | Nyamgondalu | |
| 2009/0323539 A1* | 12/2009 | Wang | H04L 41/5009 |
| | | | 370/248 |
| 2014/0379323 A1 | 12/2014 | Anastasakos et al. | |
| 2015/0058425 A1 | 2/2015 | Nathan et al. | |
| 2016/0196131 A1* | 7/2016 | Searle | H04L 29/06 |
| | | | 717/173 |
| 2016/0291940 A1* | 10/2016 | Searle | H04L 63/10 |
| 2017/0221240 A1* | 8/2017 | Stetson | G06F 16/9024 |

OTHER PUBLICATIONS

"Graph theory", Retrieved From: https://en.wikipedia.org/w/index.php?title=Graph_theory&oldid=785327609, Jun. 12, 2017, 11 Pages.

"Object-oriented programming", Retrieved From: https://en.wikipedia.org/wiki/Object-oriented_programming, Jun. 8, 2017, 16 Pages.

"International Search Report & Written Opinion Issued in PCT Application No. PCT/US18/033994", dated Oct. 16, 2018, 12 Pages.

Preiss, Bruno R., "Data Structures and Algorithms with Object-Oriented Design Patterns in C#", Retrieved From: http://programming.etherealspheres.com/backup/ebooks%20-%20Other%20Programming%20Languages/Data%20Structures%20And%20Algorithms%20With%20Object-Oriented%20Design%20Patterns%20In%20C%20Sharp.pdf, Nov. 17, 2002, 13 Pages.

Tripathi, et al., "Implementing Distributed Workflow Systems from XML Specifications", Retrieved From: https://pdfs.semanticscholar.org/d3be/0f1a75b848c1d16dc54e33831c18cfeee492.pdf, Dec. 31, 2000, 9 Pages.

"Nintex Workflow 2013 Help", http://nintexdownload.com/helpfiles/nw2013/NintexWorkflow2013UserManual.html, Published on: Oct. 18, 2016, 181 pages.

Cranshaw, et al., "Calendar.help: Designing a Workflow-Based Scheduling Agent with Humans in the Loop", In Proceedings of CHI Conference on Human Factors in Computing Systems, May 4, 2017, 12 pages.

Clancy, Heather, "How Microsoft Is Automating Business Chores", http://fortune.com/2016/03/31/microsoft-office-process-automation/, Published on: Mar. 31, 2016, 3 pages.

Allgaier, Kevin, "Automator: Scheduling Workflows to Run Automatically", http://allgaierconsulting.com/techtalk/2014/1/22/automator-scheduling-workflows-to-run-automatically, Published on: Jan. 22, 2014, 7 pages.

\* cited by examiner

DYNAMIC DIRECTED GRAPH WORKFLOWS

A workflow includes the steps necessary for carrying out an associated task. Managing workflows electronically often involves one or more of: large amounts of manual intervention, a complex code base for an automated agent, inaccuracies in the workflow (including oversimplifications of the workflow), and limited applicability of the electronic system.

SUMMARY

This summary is provided to introduce a selection of concepts in a simplified form that are further described below in the Detailed Description section. This summary is not intended to identify all key or essential features of the claimed subject matter, nor is it intended as an aid in determining the scope of the claimed subject matter.

A dynamic directed graph enables the electronic management of workflows associated with a variety of tasks with improved functionality of the computing systems involved therein, including flexibility, memory allocation, and processing efficiency. In a directed graph, various modular nodes are associated with one another in a graph structure to represent the workflow. Each node includes executable code for managing data collection and retention for elements of the workflow. As data affecting the workflow are updated, including adding or invalidating elements of the workflow, the associated nodes are dynamically updated and dependent nodes are re-executed in light of the updated data. Nodes retain historical values for the data associated with their elements as well as a current state of the element, allowing for temporal navigation of the directed graph.

Examples are implemented as a computer process, a computing system, or as an article of manufacture such as a device, computer program product, or computer readable medium. According to an aspect, the computer program product is a computer storage medium readable by a computer system and encoding a computer program comprising instructions for executing a computer process.

The details of one or more aspects are set forth in the accompanying drawings and description below. Other features and advantages will be apparent from a reading of the following detailed description and a review of the associated drawings. It is to be understood that the following detailed description is explanatory only and is not restrictive of the claims.

BRIEF DESCRIPTION OF THE DRAWINGS

The accompanying drawings, which are incorporated in and constitute a part of this disclosure, illustrate various aspects. In the drawings.

DETAILED DESCRIPTION

Figure 1:
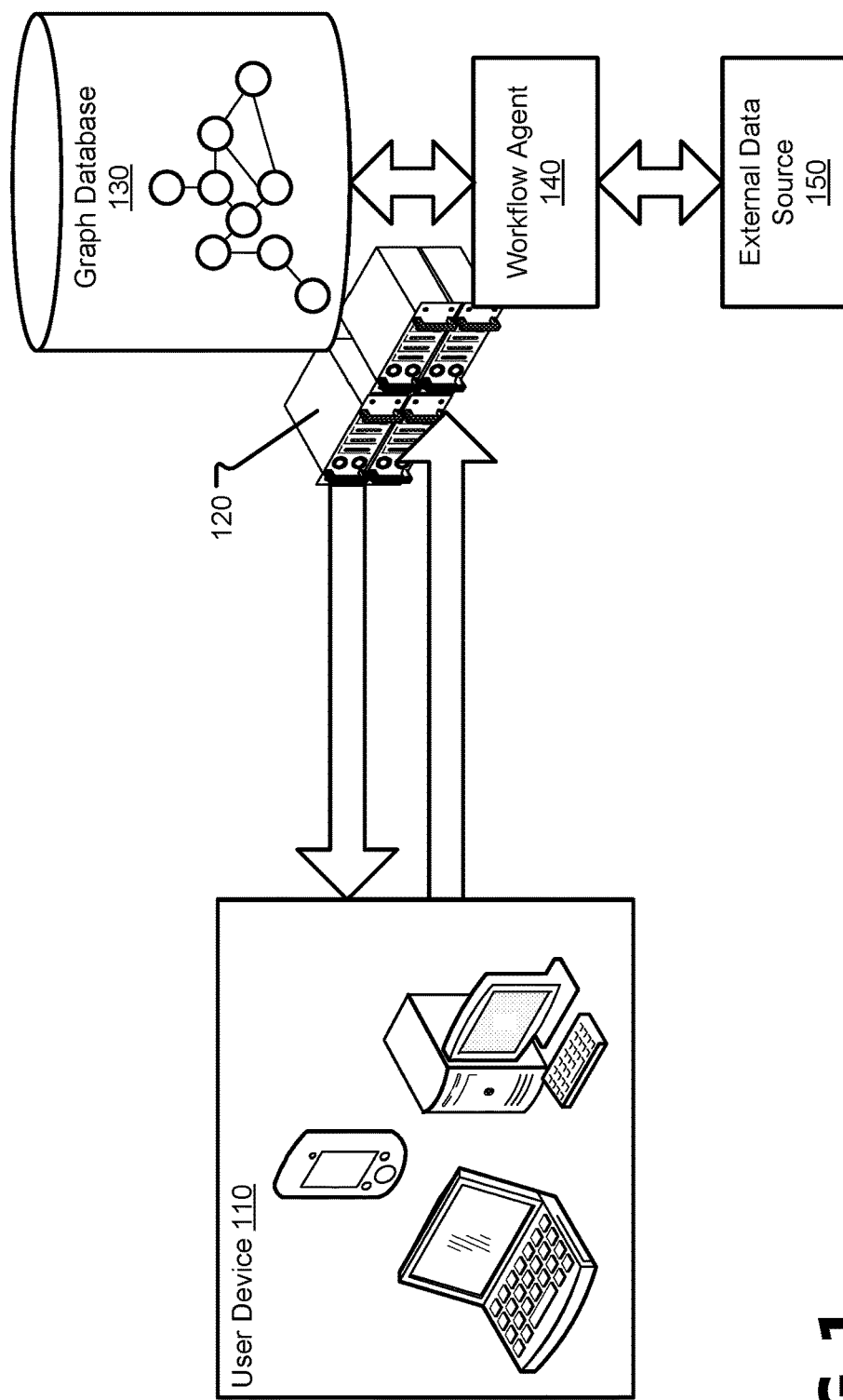
FIG. 1 illustrates an example operating environment in which the present disclosure may be practiced.

The following detailed description refers to the accompanying drawings. Wherever possible, the same reference numbers are used in the drawings and the following description refers to the same or similar elements. While examples may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description is not limiting, but instead, the proper scope is defined by the appended claims. Examples may take the form of a hardware implementation, or an entirely software implementation, or an implementation combining software and hardware aspects. The following detailed description is, therefore, not to be taken in a limiting sense.

A dynamic directed graph enables the electronic management of workflows associated with a variety of tasks with improved functionality of the computing systems involved therein, including flexibility, memory allocation, and processing efficiency. In a directed graph, various modular nodes are associated with one another in a graph structure to represent the workflow. Each node includes executable code for managing data collection and retention for elements of the workflow. As data affecting the workflow are updated, including adding or invalidating elements of the workflow, the associated nodes are updated and dependent nodes are re-executed in light of the updated data. Nodes retain historical values for the data associated with their elements as well as a current state of the element, allowing for temporal navigation of the directed graph.

In the current disclosure, several examples for workflows are given that are non-limiting. Although examples primarily take the forms of a meeting scheduling workflow and a cake baking workflow, one of ordinary skill in the art will appreciate that other workflows are contemplated by the present disclosure. Indeed, the present disclosure is operable for use with as-of-yet undefined workflows and mutable workflows (i.e., workflows in which tasks need to be revisited and may produce different results when data are updated).

FIG. 1 illustrates an example operating environment 100 in which the present disclosure may be practiced. A user device 110 is in communication with a graph server 120, which maintains a workflow graph in a graph database 130. A workflow graph maintains several entities as nodes and the relationships between those nodes as edges connecting the related nodes. The graph database 130 is operable to store one or more workflow graphs and subgraphs thereof. The graph server 120 also maintains a workflow agent 140 to handle building and maintaining the workflow graphs, responding to queries related to the workflow graphs, and obtaining data for the nodes in the workflow graphs. The workflow agent 140 acts as an engine to manage and direct the dynamic workflow graphs, and is operable to receive requests from users, query several different external data sources 150 as well as the workflow graphs to populate data in the nodes, and respond to user queries.

Each of the user device 110, graph server 120, and external data sources 150 are illustrative of a multitude of computing systems including, without limitation, desktop computer systems, wired and wireless computing systems, mobile computing systems (e.g., mobile telephones, netbooks, tablet or slate type computers, notebook computers, and laptop computers), hand-held devices, multiprocessor systems, microprocessor-based or programmable consumer electronics, minicomputers, printers, and mainframe computers. The hardware of these computing systems is discussed in greater detail in regard to FIGS. 4 and 5.

User devices 110 are operated by users, who may be humans or automated systems (e.g., "bots"). In various aspects, the user device 110, and graph server 120 may be accessed by a user or each other locally and/or by a network, which may include the Internet, a Local Area Network (LAN), a private distributed network for an entity (e.g., a company, a university, a government agency), a wireless ad hoc network, a Virtual Private Network (VPN) or other direct data link (e.g., Bluetooth connection, a direct wired link). In some aspects, the user device 110 is also an external data source 150.

While the user device 110, graph server 120, and external data sources 150 are shown remotely from one another for illustrative purposes, it should be noted that several configurations of one or more of these devices hosted locally to another illustrated device are possible, and each illustrated device may represent multiple instances of that device. Various servers and intermediaries familiar to those of ordinary skill in the art may lie between the component systems illustrated in FIG. 1 to route the communications between those systems, which are not illustrated so as not to distract from the novel aspects of the present disclosure.

The graph server 120 hosts a graph database 130 of workflow graphs with nodes describing characteristics of the workflow and a set of accompanying properties of those characteristics, such as, for example, the names, titles, ages, addresses, etc., of meeting attendees for a meeting workflow. Each property can be considered a key/value pair—a name of the property and its value. As will be appreciated, the value of a property may be a single value (e.g., TRUE, 3, 5.28, NULL, "John Doe") or an array of values (e.g., time ranges for an invitee's availability to a meeting, names of playoff teams for the pasty years, lists of airports).

In addition to properties, the nodes include modular code for determining a value of those properties from various data sources. In some aspects, the code will parse a triggering request (e.g., an email, text message, transcribed audio) for a workflow for various values. In other aspects, the code will search for values to the properties saved on the graph server 120 or an external data source 150. For example, an email acting as a trigger request for a meeting is parsed for desired times, locations, and subject matter, but the email address of a recipient is used to identify an associated person in a directory service.

In some aspects, the code will attempt to query several data sources in a preferred order until a value is determined, and if no value for the property can be determined, a user query is generated and transmitted to the user device 110 for the user to return a value. For example, if a trigger request for a workflow includes the phrase "invite Erika", the code may be unable to identify one Erika (e.g., none or several Erikas are identified), and a user query is transmitted from the workflow agent 140 to the user device 110 to clarify the identity of "Erika". In some aspects, the value for a property is left as NULL when a value cannot be determined from the data sources and/or a user indicates that the value is not required. For example, for a meeting workflow, several attendees may be listed as optional attendees (rather than required attendees) and failures to obtain their schedules will not result in a user query or prevent the workflow from providing a final response, so NULL would be a valid value for their schedules.

A workflow graph includes several nodes, which are related to one another via various dependencies. For example, in a workflow for baking a cake, a workflow may include the nodes of "select recipe," "gather ingredients," "mix ingredients," "bake," and "decorate." In this example workflow for baking a cake, the "gather ingredients" node would depend from the "select recipe" node; which ingredients are to be gathered requires knowledge of the recipe selected.

In another example, a "schedule meeting" workflow may include nodes to "determine participants," "determine participant availability," and "identify mutually acceptable time." Some participants in this example, however, may be noted as required, and others as optional. In this case, the "identify mutually acceptable time" node may depend from all of the "determine participant availability" nodes (for each identified participant), but will produce a result of a meeting time even if availabilities for the optional participants are not known or otherwise conflict with the produced time.

State information is maintained by the nodes for their associated properties to keep a historical record for the values held by that property as the workflow graph develops over time. For example, in a workflow graph for a meeting, the changing times and availabilities of the attendees are updated in the nodes. When the value of a node changes, nodes that depend from the changed node will be rerun to determine if their values should also be updated. In the example for a cake baking workflow, when the property of "German Chocolate cake" in the "select recipe" node changes to "Strawberry Coconut cake," the code in the "gather ingredients" node will rerun with the new ingredient set, and the "mix ingredients," "bake," and "decorate" nodes will also be subsequently run.

In various aspects, each of the nodes in the workflow graph is an instance of a modular node definition. For example, when N participants are included in a meeting scheduling workflow, a modular node definition for gathering the contact information and schedule availability will be instantiated N times to produce N nodes—one each for the N participants to gather and store information for an associated participant. The modular node definitions are capable of being used across different workflow types so that several types of workflows can make use of similar code and storage capabilities.

The workflow agent 140 and the code within the nodes themselves gather data to populate values for properties in the nodes, identify dependencies between nodes, and run the code included in those nodes based on the values and dependencies, thereby providing a workflow graph that is both dynamic and directed. As changes or updates to the values of the nodes are observed, the workflow agent 140, or code present in other nodes, adjusts the workflow graph in response to those changes; adding nodes, invalidating nodes, updating values in the nodes, and running the codes of the nodes according to updated dependencies to keep the output of the workflow graph up-to-date. In various aspects, the workflow agent 140, or code within the nodes, receives data in messages (e.g., emails, text messages, voice commands) from a user device 110, but also queries various external data sources 150, such as, for example, user devices 110, directory services, calendar services, and databases.

The workflow agent 140 also executes graph queries on the workflow graph that are submitted by various users. A graph query requested by a user device 110 spans the current state or specified earlier state of the workflow graph structure to return a value from one or more nodes. In various aspects, the workflow agent 140 notes the status of the workflow and makes updates to various systems based on the status of the workflow. For example, for a meeting workflow, as participants accept, decline, request meeting times, add other events to their calendars, etc., the workflow agent 140 and the code in the nodes will update the nodes in the workflow graph and will update a calendar server with a finalized meeting time as produced by the workflow graph for the meeting.

The final result includes the output from one or more designated output nodes for the workflow graph. For example, a meeting request or a baked cake are the final results of meeting workflows and cake recipe workflows, but queries may also be made to the non-output nodes to provide the values of those nodes. Similarly, a user may query a historic value from one or more nodes. In one example, a user may query "what was the original meeting time" to receive a historic value from the "meeting time" node of a meeting workflow. In another example, a user may request "what was the last ingredient list" to receive the prior value of an "ingredient list" node even though the "ingredient list" node does not provide the final result of the workflow.

Historic values maintained by nodes allow not only for the lookup of these values, but the avoidance of repeated outputs when new outputs are desired and the reversion to prior states of the workflow graph. For example, when a first state of a meeting workflow graph sets the meeting time on a first date/time (e.g., Monday at noon), and an invitee later notes a conflict such that the meeting time needs to be updated in a second state of the workflow graph, the nodes will propose new dates/times (e.g., Tuesday at noon). Historic values stored in the nodes are used to avoid proposing dates/times that were previously proposed and/or rejected. Continuing the example, if the invitee notes after the meeting is rescheduled that the conflict has cleared, the nodes may consult the current and historic meeting dates/times to query the users whether the current output value of the workflow graph should be used or if a prior output value should be reverted to.

In various aspects, the workflow agent 140 includes a "bot" or personal digital assistant (e.g., ALEXA® or SIRI® provided by Amazon.com, Inc. of Seattle, Wash. and Apple, Inc. of Cupertino, Calif. respectively) to enable the user to submit triggers for the workflow, updates to the workflow graph, and graph queries via natural language communications in addition to or instead of specifically formatted commands. The natural language communications include text and audio communications, which the workflow agent 140 will parse, via an integrated Natural Language Processor (NLP) or external NLP provider, for key words, syntax, and user identities to act as triggers, updates, and graph queries. In various aspects, the workflow agent 140 will communicate back and forth with the user, requesting clarification or authorization as appropriate.

Figure 2:
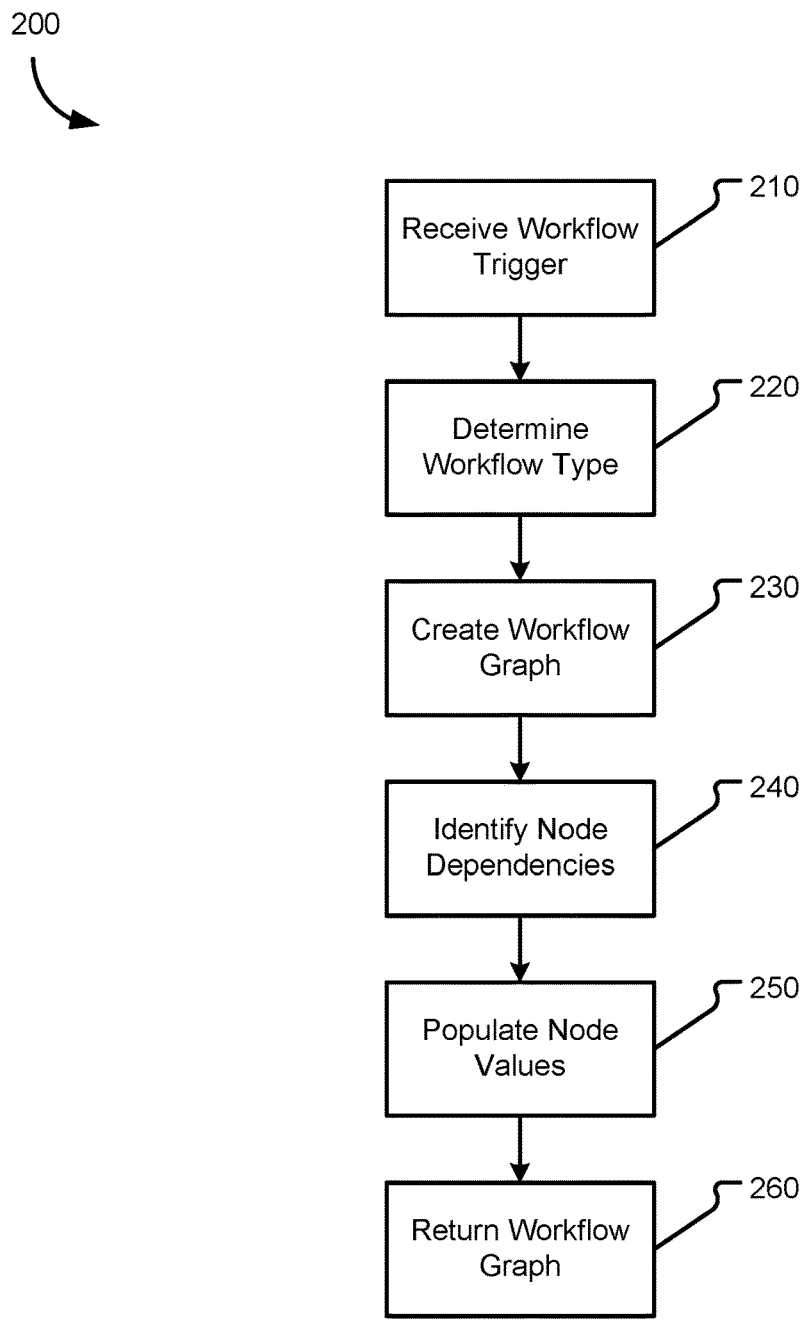
FIG. 2 is a flow chart showing general stages involved in an example method for initializing a dynamic directed workflow graph.

FIG. 2 is a flow chart showing general stages involved in an example method 200 for initializing a dynamic directed workflow graph. Method 200 begins at OPERATION 210, where a workflow trigger is received. In various aspects, the workflow agent 140 receives a workflow trigger from a user device 110 that specifically requests a given workflow. For example, a user may email another user and the workflow agent 140 to establish a workflow. In other aspects, the workflow agent 140 monitors communications from the user and parses those communications to determine whether a workflow trigger is implied in the communication. For example, a user may instant message another user with the query of "Are you free to meet on Friday?," which the workflow agent 140 will parse to identify the implied workflow trigger for a meeting scheduling workflow. In aspects where an implied workflow request is identified by the workflow agent 140, the workflow agent 140 will request authorization from the user before initiating the workflow.

In response to receiving the workflow trigger, method 200 proceeds to OPERATION 220, where a type of workflow is determined. In various aspects, the type of workflow is specified by the user in the workflow trigger by a specifically formatted command, while in other aspects, the content of the workflow trigger is parsed by the workflow agent 140 to determine a most likely workflow type or types. For example, a workflow trigger including the content of "When do you want to meet to bake a cake?," may be interpreted by the workflow agent 140 as including two types of workflows; one for scheduling a meeting and another for baking a cake or as one workflow that includes a meeting scheduling workflow and a cake baking workflow. In response to identifying a multi-part workflow, like in the above example, the workflow agent 140 may query the user to select one or more of the identified workflow types to create an individual workflow for, or to select that one or more multi-part workflows for two or more of the identified workflow types is to be created.

At OPERATION 230 a workflow graph is created based on the workflow trigger and the identified type of workflow. The workflow graph is initially created with a set of nodes based on the information parsed from the workflow trigger. For example, with a workflow trigger of an email attempting to schedule a meeting, nodes for each addressee of the email are created, but as addressees are added or removed from the meeting, new nodes may be added or existing nodes invalidated for the current state of the workflow graph (discussed in greater detail in regard to FIG. 3). In some aspects, a template directed graph is stored in the graph database 130 for each workflow type, such that when a workflow graph is created, the appropriate template is copied to create a new instance. Existing templates are updatable and new templates may be manually added by a user or automatically added in response to identifying new workflow types.

The plurality of nodes included in the workflow graph each include code used to populate a value for one or more properties stored in the node. In various aspects, as the workflow graph changes, the values for each historic state of the node is maintained in addition to the current value for the property. In various aspects, when a node is invalidated from the workflow graph, the property value for that node will remain the last-known value and state from when the invalidated node was valid. In other aspects, an invalidated node or not-yet added node for a given state of the workflow graph maintains a NULL value for the property and state.

Proceeding to OPERATION 240, the workflow agent 140 identifies dependencies between the nodes of the plurality of nodes included in the workflow graph. The dependencies form a hierarchical structure between the nodes, where parent nodes supply their outputs as inputs to dependent, child nodes. In the hierarchical structure, the one or more nodes that depend from no other nodes are referred to as root nodes, and the one or more nodes that have no dependent nodes are referred to as leaf nodes. Within the workflow graph, one or more nodes are designated as output nodes from the workflow graph, which may be leaf nodes or nodes that include child nodes depending therefrom. Each node may depend from several parents and include several child nodes Additionally, in some aspects, the dependencies between nodes indicate whether a dependency is required or optional for a child node to process its code. For example, in a meeting scheduling workflow, several invitees may be indicated as required attendees and other invitees indicated as optional attendees. The scheduling information for the required attendees would therefore be marked as a required dependency for a "determine meeting time" node, whereas the scheduling information for the optional attendees would be marked as optional, and the node would be able to run without obtaining values for those optional dependencies.

At OPERATION 250 the values of the nodes are populated by running the code in the nodes according to the identified dependencies. When running the nodes' code according to the identified dependencies, information waterfalls through the nodes according to the structure of the workflow graph. Depending on the code in the nodes, various dependent nodes may loop to return a data value. For example, a node requesting a given property may seek that property by first running a dependent node to parse a workflow trigger for a value, and if the parsing node does not return a value, a second sub-node is run to request the value from an external data source 150 or a user device 110. For example, when a failure to automatically populate a value of a node occurs, a user may be queried to supply the value, and the user's response will be parsed to populate the value.

Method 200 concludes with OPERATION 260, where an output value for the workflow graph is returned. In various aspects, the output value is the value of an output node for the workflow graph depending from the other nodes making up the workflow graph (e.g., a node at the end of the dependency chain). For example, for a workflow to schedule a meeting, a meeting time and location would be the output value for the workflow graph. In various aspects, the output value is returned to a user device 110 or a server designated by the user device 110 for receiving the output, such as, for example, a server accessible by the user device 110.

Figure 3:
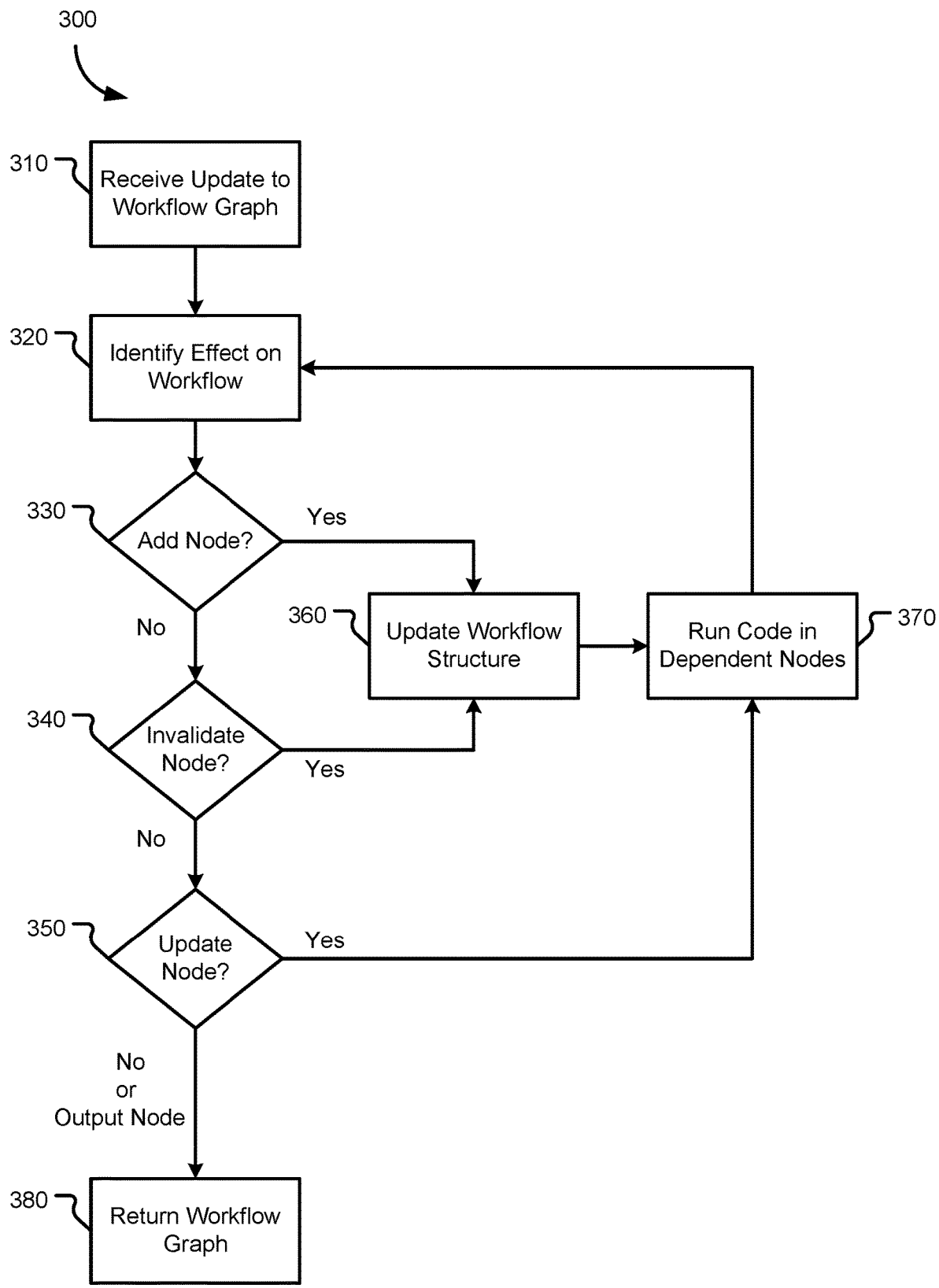
FIG. 3 is a flow chart showing general stages involved in an example method for updating a dynamic directed workflow graph

FIG. 3 is a flow chart showing general stages involved in an example method 300 for updating a dynamic directed workflow graph. Method 300 begins with OPERATION 310, where an update to the workflow graph is received. In various aspects, an update is received by the workflow agent 140 from a user device 110 requesting a different value for one or more nodes of the workflow graph. For example, a user accessing a cake baking workflow may request a different recipe or indicate that a substitute ingredient is necessary. In another example, a user accessing a meeting scheduling workflow may request a new meeting time or indicate that a new participant should be added to the meeting. In other aspects, an update to the workflow graph is received based on an update from a parent node in the dependency structure of the workflow graph. For example, in the cake baking workflow, indicating a change to the recipe will impact nodes related to the ingredient list, baking time, etc., that depend from the recipe node.

Method 300 proceeds to OPERATION 320, where the effect of the update on the workflow is identified. An update will have at least one of the following effect types: adding at least one node to the workflow graph; invalidating a node in the workflow graph; updating a value of a node in the update graph; or no effect. DECISIONS 330-350 are based on the identified updates to the workflow, and are made in parallel for a given update.

At DECISION 330 it is determined whether a node has been added by the update to the workflow graph. For example, in a meeting scheduling workflow, when a new invitee is added as a participant, nodes related to the invitee's information (e.g., contact information, scheduling availability, preferences) are added to the workflow graph. In response to the update adding a node, method 300 proceeds to OPERATION 360.

At DECISION 340 it is determined whether a node has been invalidated by the update to the workflow graph. For example, in a meeting scheduling workflow, when an invitee to the meeting is removed as a participant, the nodes related to the invitee's information (e.g., contact information, scheduling availability, preferences) are invalidated as they are no longer relevant to the current state of the workflow graph in light of the update. In response to the update invalidating a node, method 300 proceeds to OPERATION 360.

Proceeding from positive determination at DECISIONS 330 or 340 that the number of nodes comprising the workflow graph has changed (via addition or invalidation, respectively), the workflow structure is updated at OPERATION 360. The dependencies for the workflow graph are re-determined, adjusting which nodes depend from one another to account for the different composition of the workflow graph in its current state. New dependencies are established relative to new nodes, and existing dependencies for invalidated nodes are removed. As will be appreciated, nodes are added or invalidated relative to a current state of the graph workflow; prior states of the workflow graph maintained on the graph database 130 retain the original number and dependencies of nodes. Method 300 the proceeds to OPERATION 370.

At DECISION 350 it is determined whether a value of a node has been changed by the update to the workflow graph. For example, in a meeting scheduling workflow, when the update changes values for data related to a current invitee (e.g., new scheduling data, additional contact information, corrected preferences), the nodes that maintain those data are updated. As will be appreciated, the node maintains the historic values for the data for the prior states of the workflow graph, and various historical identifiers may be used to query the prior states of the workflow graph and its nodes or to revert to that prior state. In response to the update changing a value for a property of a node, method 300 proceeds to OPERATION 370 unless the node whose value was changed is an output node for the workflow graph, in which case method 300 proceeds to OPERATION 380.

Method 300 proceeds to OPERATION 370 to run the code in the dependent nodes of the newly added, invalidated, or updated nodes. As will be appreciated, an update may affect nodes at several layers in a dependency hierarchy, and running the code in the dependent nodes will proceed through the identified dependency hierarchy for the workflow graph; code in nodes higher in the dependency are run before code in nodes depending therefrom. As the update affects dependent nodes, the changes to those nodes are treated as additional updates to the nodes, and method 300 loops to OPERATION 320 to determine what effect, if any, the update has on the dependent nodes.

To illustrate, consider the example of a cake baking workflow with the nodes of "select recipe," "gather ingredients," "mix ingredients," "bake," and "decorate," for which an original update affects the values of "select recipe" and "gather ingredients" nodes. The code will be run in the "select recipe" node based on the changed value, and use the new output of the select recipe node when running the "gather ingredients" node in addition to the updated value for the "gather ingredients" node. Similarly, the other dependent nodes are run with the updated values from their parents, and their run may incorporate changes made in one or more loops of OPERATION 320-370.

As will be appreciated, given node's execution may be paused for an arbitrary length of time to wait for a parent node to populate data, to wait for a process to complete in the node itself or a parallel node, to devote resources to a parallel node, etc. For example, when baking a cake, there may be a pause while the cake is in the oven and then again while it cools before the step of applying the icing may proceed. However, some nodes can execute in parallel, so that, for example, a "bake cake" node may execute in parallel with a "prepare icing" node. Similarly, in a meeting workflow, there might be a pause of hours (or even days) while waiting to hear back from attendees about the acceptability of proposed meeting times. Because the state of each node and the dependencies between nodes are stored in the graph database 130, one skilled in the art will appreciate how to save and restore the context of a given workflow to work with and around pauses in executions of the workflow.

In response to the update not adding a node, invalidating a node, or changing a value of a node, method 300 proceeds from DECISIONS 330-350 to OPERATION 380; the update has had no effect on the workflow. For example, a user may initiate an update to the workflow graph to correct contact information for the user (e.g., supply a new email address or telephone number). After the node containing this updated contact information is updated, and OPERATION 370 has been performed based on this update, method 300 will proceed again to OPERATION 320 and DECISIONS 330-350. If the updated contact information did not affect any other nodes, it will be determined during the second execution of OPERATION 320 that the update had no effect on the dependent nodes, and method 300 will proceed to OPERATION 380.

At OPERATION 380 the output value for the workflow graph is returned. In various aspects, a "no changes" response is returned when the value of an output node for the workflow graph does not change in response to an update to one or more of its parent nodes. For example, when an added participant's schedule works with an existing meeting time, an output value for a meeting scheduling workflow may remain the same. The output values for the workflow graph are communicated to a user device 110 and/or the graph server 120 to update the state of the workflow graph.

While implementations have been described in the general context of program modules that execute in conjunction with an application program that runs on an operating system on a computer, those skilled in the art will recognize that aspects may also be implemented in combination with other program modules. Generally, program modules include routines, programs, components, data structures, and other types of structures that perform particular tasks or implement particular abstract data types.

The aspects and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), handheld devices, multiprocessor systems, microprocessor-based or programmable consumer electronics, minicomputers, and mainframe computers.

In addition, according to an aspect, the aspects and functionalities described herein operate over distributed systems (e.g., cloud-based computing systems), where application functionality, memory, data storage and retrieval and various processing functions are operated remotely from each other over a distributed computing network, such as the Internet or an intranet. According to an aspect, user interfaces and information of various types are displayed via on-board computing device displays or via remote display units associated with one or more computing devices. For example, user interfaces and information of various types are displayed and interacted with on a wall surface onto which user interfaces and information of various types are projected. Interaction with the multitude of computing systems with which implementations are practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 4:
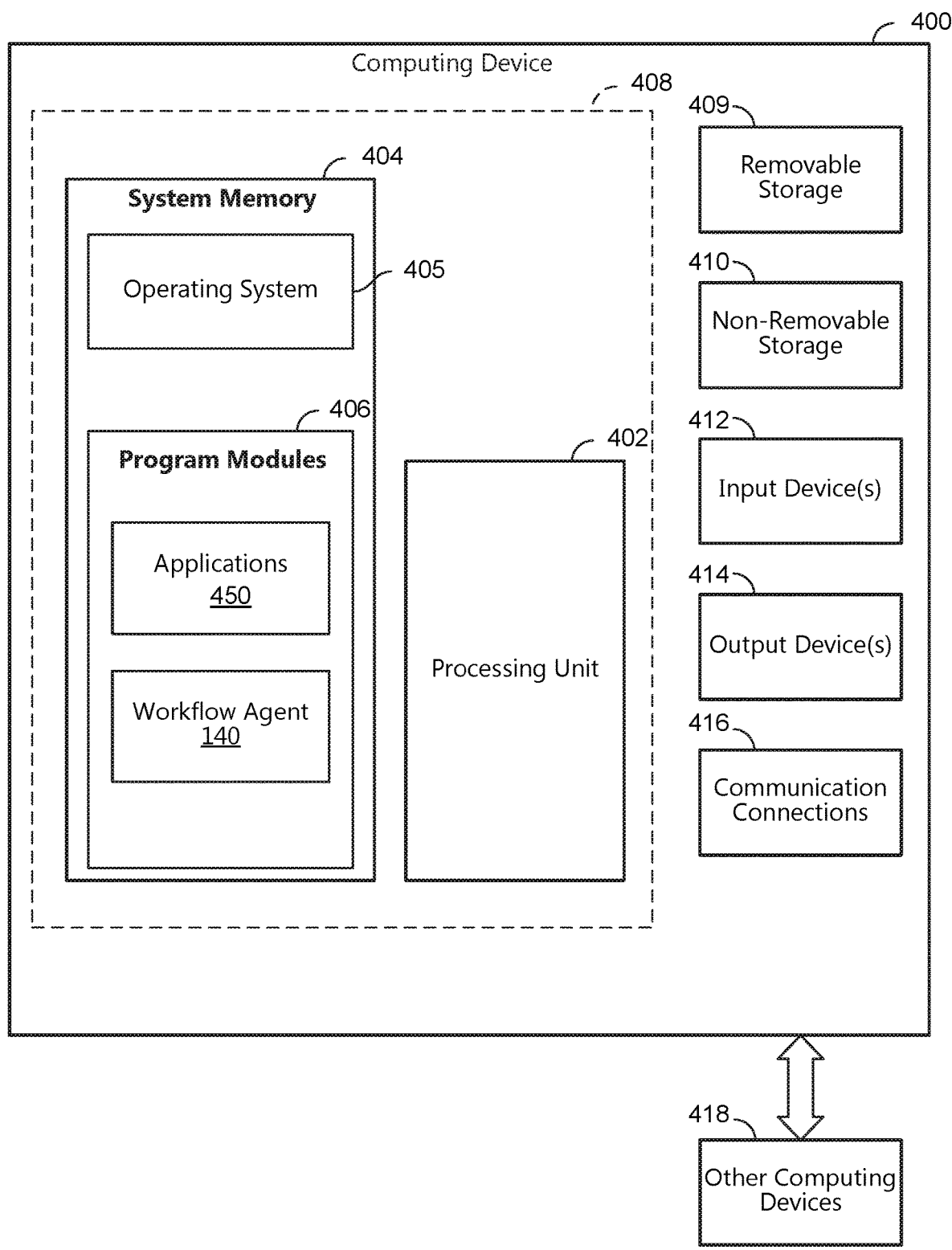
FIG. 4 is a block diagram illustrating example physical components of a computing device.
Figure 5:
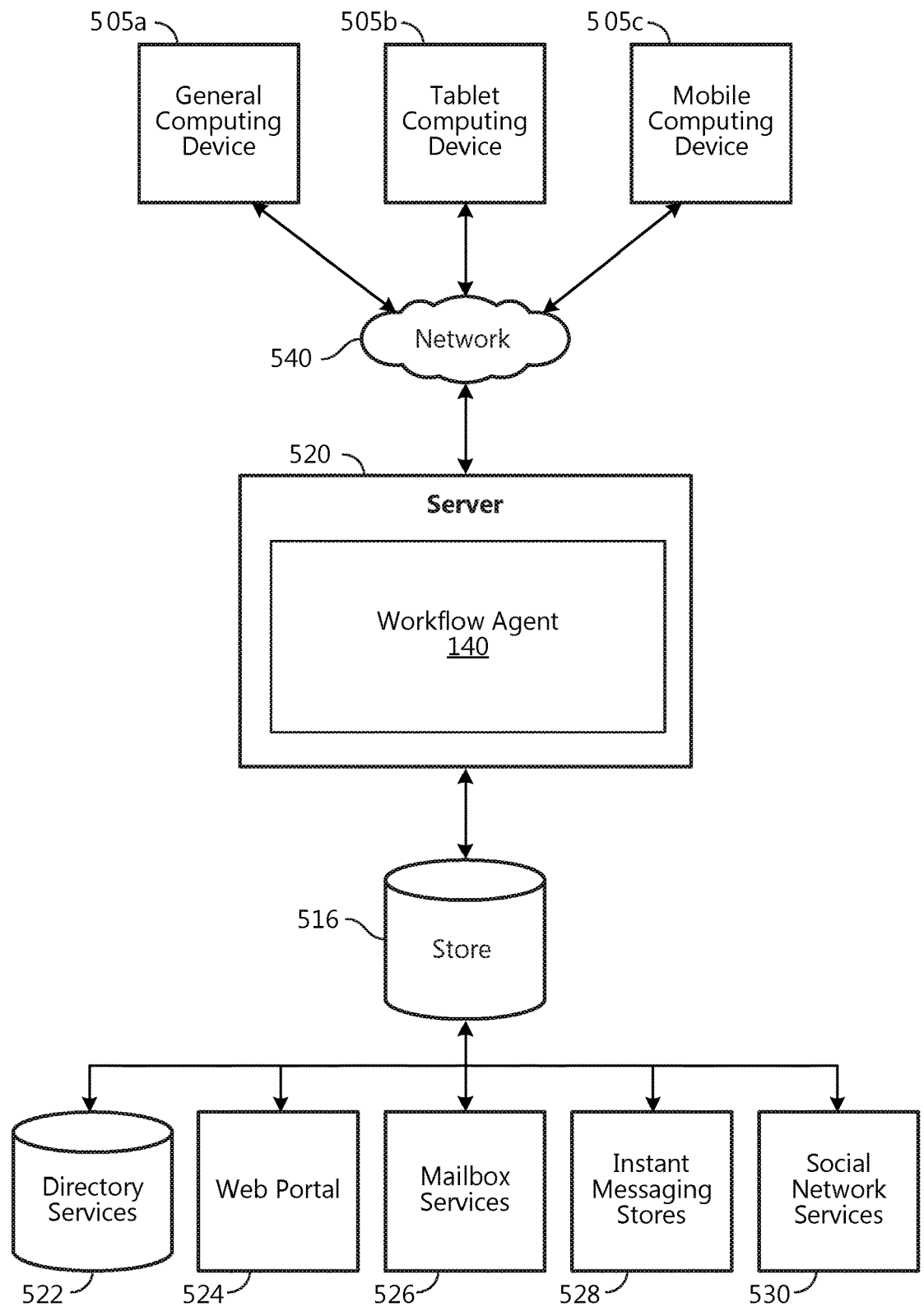
FIG. 5 is a block diagram of a distributed computing system.

FIGS. 4 and 5 and the associated descriptions provide a discussion of a variety of operating environments in which examples are practiced. However, the devices and systems illustrated and discussed with respect to FIGS. 4 and 5 are for purposes of example and illustration and are not limiting of a vast number of computing device configurations that are used for practicing aspects, described herein.

FIG. 4 is a block diagram illustrating physical components (i.e., hardware) of a computing device 400 with which examples of the present disclosure may be practiced. In a basic configuration, the computing device 400 includes at least one processing unit 402 and a system memory 404. According to an aspect, depending on the configuration and type of computing device, the system memory 404 comprises, but is not limited to, volatile storage (e.g., random access memory), non-volatile storage (e.g., read-only memory), flash memory, or any combination of such memories. According to an aspect, the system memory 404 includes an operating system 405 and one or more program modules 406 suitable for running software applications 450. According to an aspect, the system memory 404 includes workflow agent 140. The operating system 405, for example, is suitable for controlling the operation of the computing device 400. Furthermore, aspects are practiced in conjunction with a graphics library, other operating systems, or any other application program, and are not limited to any particular application or system. This basic configuration is illustrated in FIG. 4 by those components within a dashed line 408. According to an aspect, the computing device 400 has additional features or functionality. For example, according to an aspect, the computing device 400 includes additional data storage devices (removable and/or non-removable) such as, for example, magnetic disks, optical disks, or tape. Such additional storage is illustrated in FIG. 4 by a removable storage device 409 and a non-removable storage device 410.

As stated above, according to an aspect, a number of program modules and data files are stored in the system memory 404. While executing on the processing unit 402, the program modules 406 (e.g., workflow agent 140) perform processes including, but not limited to, one or more of the stages of the methods 200 and 300 illustrated in FIGS. 2 and 3. According to an aspect, other program modules are used in accordance with examples and include applications such as electronic mail and contacts applications, word processing applications, spreadsheet applications, database applications, slide presentation applications, drawing or computer-aided application programs, etc.

According to an aspect, the computing device 400 has one or more input device(s) 412 such as a keyboard, a mouse, a pen, a sound input device, a touch input device, etc. The output device(s) 414 such as a display, speakers, a printer, etc. are also included according to an aspect. The aforementioned devices are examples and others may be used.

According to an aspect, the computing device 400 includes one or more communication connections 416 allowing communications with other computing devices 418. Examples of suitable communication connections 416 include, but are not limited to, radio frequency (RF) transmitter, receiver, and/or transceiver circuitry; universal serial bus (USB), parallel, and/or serial ports.

The term computer readable media, as used herein, includes computer storage media. Computer storage media include volatile and nonvolatile, removable and non-removable media implemented in any method or technology for storage of information, such as computer readable instructions, data structures, or program modules. The system memory 404, the removable storage device 409, and the non-removable storage device 410 are all computer storage media examples (i.e., memory storage.) According to an aspect, computer storage media include RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 400. According to an aspect, any such computer storage media are part of the computing device 400. Computer storage media do not include a carrier wave or other propagated data signal.

According to an aspect, communication media are embodied by computer readable instructions, data structures, program modules, or other data in a modulated data signal, such as a carrier wave or other transport mechanism, and include any information delivery media. According to an aspect, the term "modulated data signal" describes a signal that has one or more characteristics set or changed in such a manner as to encode information in the signal. By way of example, and not limitation, communication media include wired media such as a wired network or direct-wired connection, and wireless media such as acoustic, radio frequency (RF), infrared, and other wireless media.

FIG. 5 illustrates one example of the architecture of a system providing dynamic directed workflows. Content developed, interacted with, or edited in association with the workflow agent 140 is enabled to be stored in different communication channels or other storage types. For example, various documents may be stored using a directory service 522, a web portal 524, a mailbox service 526, an instant messaging store 528, or a social networking site 530. The workflow agent 140 is operative to use any of these types of systems or the like for providing dynamic directed workflows, as described herein. According to an aspect, a server 520 provides the workflow agent 140 to clients 505*a,b,c*. As one example, the server 520 is a web server providing the workflow agent 140 over the web. The server 520 provides the workflow agent 140 over the web to clients 505 through a network 540. By way of example, the client computing device is implemented and embodied in a personal computer 505*a*, a tablet computing device 505*b* or a mobile computing device 505*c* (e.g., a smart phone), or other computing device. Any of these examples of the client computing device are operable to obtain content from the store 516.

Implementations, for example, are described above with reference to block diagrams and/or operational illustrations of methods, systems, and computer program products according to aspects. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more examples provided in this application are not intended to limit or restrict the scope as claimed in any way. The aspects, examples, and details provided in this application are considered sufficient to convey possession and enable others to make and use the best mode. Implementations should not be construed as being limited to any aspect, example, or detail provided in this application. Regardless of whether shown and described in combination or separately, the various features (both structural and methodological) are intended to be selectively included or omitted to produce an example with a particular set of features. Having been provided with the description and illustration of the present application, one skilled in the art may envision variations, modifications, and alternate examples falling within the spirit of the broader aspects of the general inventive concept embodied in this application that do not depart from the broader scope.

We claim:

1. A computing system for providing dynamic directed workflows, the computing system comprising:
a processor; and
a memory storing instructions that are executable by the processor to cause the computing system to:
parse an electronic message from a user computing device to identify a workflow trigger included in the electronic message; and
upon identifying the workflow trigger,
create, in the memory, a data structure representing a workflow graph based on the workflow trigger, the workflow graph including a plurality of nodes interconnected to one another, wherein each of the plurality of nodes stores a property having a corresponding value and includes machine executable code to populate the value of the property upon execution by the processor;
identify node dependencies of the plurality of nodes in the created workflow graph, wherein to identify the dependencies include to identify a node in the plurality of nodes as a parent node having machine executable code execution of which provides an output to a child node as an input to the machine executable code of the child node;
automatically execute, with the processor, the machine executable code in the plurality of nodes according to an execution sequence based on the identified dependencies to populate the value of each node of the plurality of nodes to generate an output value of the workflow path, wherein the machine executable code of the child node is executed after the machine executable code of the parent node is executed; and
upon completion of populating the values of the properties in the plurality of nodes, transmit, via another electronic message, the output value of the workflow graph to the user device.

2. The system of claim 1, further operable to:
receive an update to the workflow graph, wherein the update adds a new node to the plurality of nodes;
determine new dependencies for the new node relative to the plurality of nodes;
re-run the code of nodes of the plurality of nodes depending from the new node; and return the output value of the workflow graph to the user device.

3. The system of claim 1, further operable to:
receive an update to the workflow graph, wherein the update invalidates a given node of the plurality of nodes;
remove dependencies between the plurality of nodes and the invalidated node;
re-run the code of nodes of the plurality of nodes previously depending from the invalidated node; and
return the output value of the workflow graph to the user device.

4. The system of claim 1, further operable to:
receive an update to the workflow graph, wherein the update changes a value of an existing node of the plurality of nodes;
re-run the code of nodes of the plurality of nodes depending from the updated node; and
return the output value of the workflow graph to the user device.

5. The system of claim 1, wherein the plurality of nodes maintain historical values across various states of the workflow graph.

6. The system of claim 5, further operable to:
receive a graph query from the user device including a value type and a historical identifier;
identify, in the workflow graph, a node responsive to the graph query; and
return a response to the user device including the value of the responsive node according to the historical identifier.

7. The system of claim 6, wherein the responsive node is an invalidated node in a current state of the workflow graph and a valid node in a prior state of the workflow graph associated with the historical identifier.

8. A computer-implemented method for providing dynamic directed workflows, comprising:
receiving, at a computing device having a processor and a memory, data representing a workflow trigger from a user device; and
in response to receiving the workflow trigger,
creating, in the memory of the computing device, a data structure representing a workflow graph based on the workflow trigger, the workflow graph including a plurality of nodes interconnected to one another, wherein each node of the plurality of nodes stores a property having a corresponding value and includes machine executable code to populate the value of the property upon execution by the processor of the computing device;
identifying dependencies of the plurality of nodes in the created workflow graph, wherein identifying the dependencies include identifying a node in the plurality of nodes as a parent node having machine executable code execution of which provides an output to a child node as an input to the machine executable code of the child node;
running, with the processor of the computing device, the machine executable code in the plurality of nodes according to an execution sequence based on the identified dependencies to populate the value of each node of the plurality of nodes to generate an output of the workflow path, wherein the machine executable code of the child node is executed after the machine executable code of the parent node is executed; and
upon completion of populating the values of the properties at the plurality of nodes in the created workflow graph, returning the output value of the workflow graph to the user device.

9. The method of claim 8, further comprising:
in response to a failure to populate the value of a given node, determining whether the given node is a required node.

10. The method of claim 9, further comprising:
in response to determining that the given node is a required node, querying a user to supply the value for the given node.

11. The method of claim 10, wherein querying the user includes:
transmitting a message to the user;
receiving a response from the user;
parsing the response; and
using the parsed response to supply the value.

12. The method of claim 9, further comprising:
in response to determining that the given node is not a required node, running the code in dependent nodes of the given node with a null value for the value of the given node.

13. The method of claim 8, further comprising:
receiving an update to the workflow graph;
determining an effect of the update on the workflow graph, wherein the effect includes at least one of: adding a node to the workflow graph, invalidating a node in the workflow graph, updating a value of a node in the workflow graph, and no effect; and
updating the workflow graph based on the effect.

14. The method of claim 8, wherein the nodes retain historic values for prior states of the workflow graph in addition to the value for a current state of the workflow graph.

15. The method of claim 14, wherein the historic values are indexed according to a state of the workflow graph and enable the workflow graph to be queried via a specified state of the workflow graph.

16. The method of claim 14, further comprising:
in response to receiving an update to the workflow graph that invalidates a node in the workflow graph, removing dependencies between the plurality of nodes and the invalidated node in the current state of the workflow graph while retaining dependencies in the prior states of the workflow graph.

17. The method of claim 14, further comprising:
in response to receiving an update to the workflow graph that adds a new node to the workflow graph, adding the new node to the current state of the workflow graph.

18. A computer storage device containing instructions executable by a processor to cause a computer to perform a process comprising:
receiving, at a computing device having a processor and a memory, data representing a workflow trigger from a user device; and
in response to receiving the workflow trigger,
creating, in the memory of the computing device, a data structure representing a workflow graph based on the workflow trigger, the workflow graph including a plurality of nodes interconnected to one another, wherein each node of the plurality of nodes stores a property having a corresponding value and includes machine executable code to populate the value of the property upon execution by the processor of the computing device;

identifying dependencies of the plurality of nodes in the created workflow graph, wherein identifying the dependencies include identifying a node in the plurality of nodes as a parent node having machine executable code execution of which provides an output to a child node as an input to the machine executable code of the child node;

running, with the processor of the computing device, the machine executable code in the plurality of nodes according to an execution sequence based on the identified dependencies to populate the value of each node of the plurality of nodes to generate an output of the workflow path, wherein the machine executable code of the child node is executed after the machine executable code of the parent node is executed; and upon completion of populating the values of the properties at the plurality of nodes in the created workflow graph, returning the output value of the workflow graph to the user device.

19. The computer storage device of claim 18 further comprising additional instructions executable by the processor to cause the computer to perform:

receiving an update to the workflow graph;

determining an effect of the update on the workflow graph, wherein the effect includes at least one of: adding a node to the workflow graph, invalidating a node in the workflow graph, updating a value of a node in the workflow graph, and no effect; and updating the workflow graph based on the effect.

20. The computer storage device of claim 18 further comprising additional instructions executable by the processor to cause the computer to perform:

in response to a failure to populate the value of a given node, determining whether the given node is a required node.

* * * * *